Sept. 11, 1956
L. B. JAHN
2,762,059
WATER CLOSET FLUSHING MECHANISM
Filed May 12, 1952
7 Sheets-Sheet 1
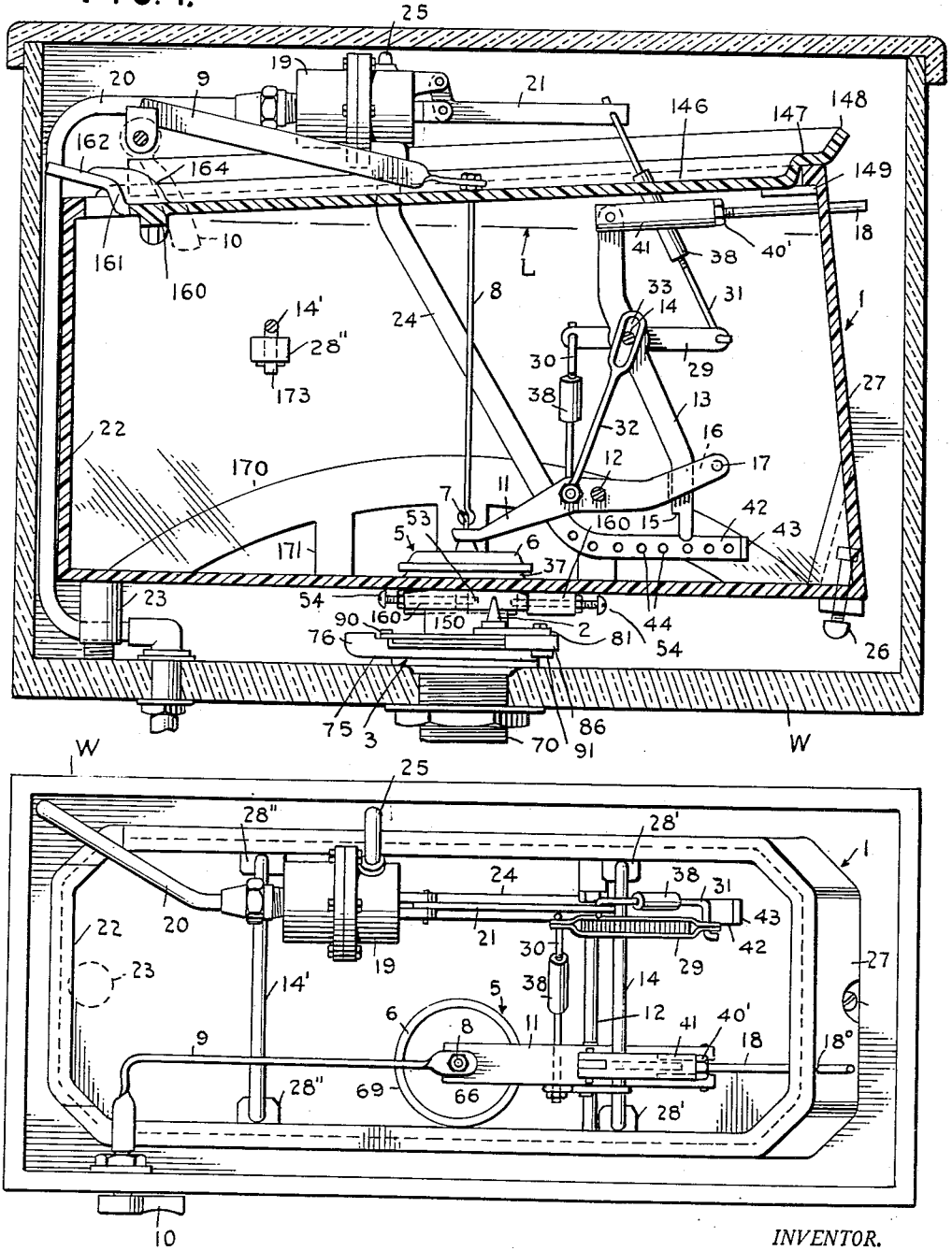
Fig. 1.
Fig. 2.
INVENTOR.
LEROY B. JAHN
BY 
ATTORNEY Sept. 11, 1956　　　　　　　L. B. JAHN　　　　　　　2,762,059
WATER CLOSET FLUSHING MECHANISM
Filed May 12, 1952　　　　　　　　　　　　　　　7 Sheets-Sheet 2
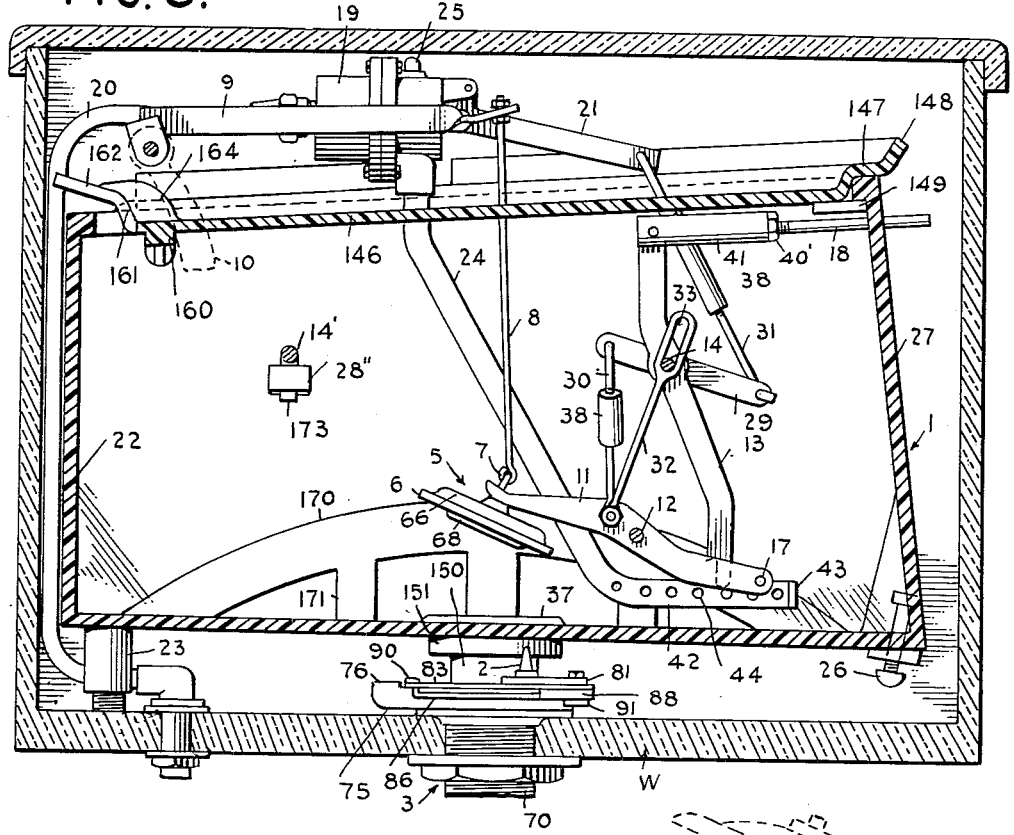
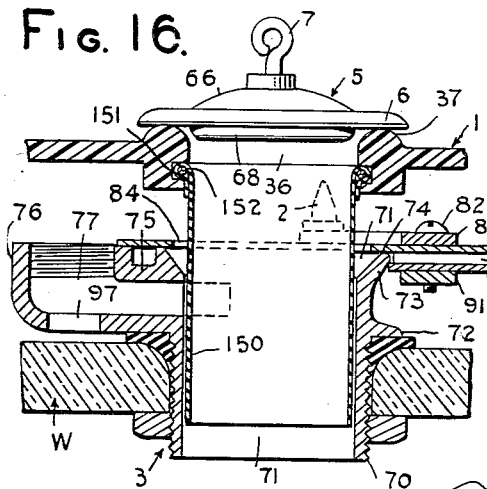
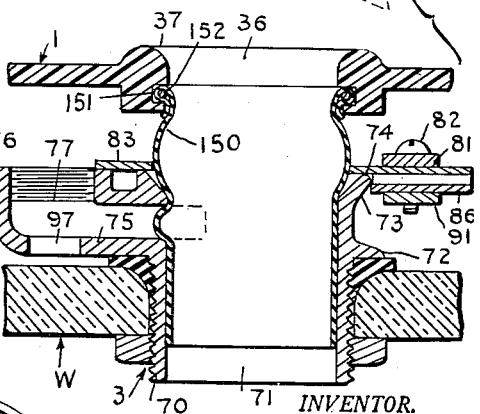
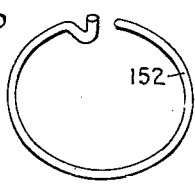
INVENTOR.
LEROY B. JAHN
BY
ATTORNEY Sept. 11, 1956　　　　　L. B. JAHN　　　　　2,762,059
WATER CLOSET FLUSHING MECHANISM
Filed May 12, 1952　　　　　　　　　　　7 Sheets-Sheet 3

INVENTOR.
LEROY B. JAHN
BY
ATTORNEY

Sept. 11, 1956 L. B. JAHN 2,762,059
WATER CLOSET FLUSHING MECHANISM
Filed May 12, 1952 7 Sheets-Sheet 4

INVENTOR.
LEROY B. JAHN
BY
ATTORNEY

Sept. 11, 1956
L. B. JAHN
2,762,059
WATER CLOSET FLUSHING MECHANISM
Filed May 12, 1952
7 Sheets-Sheet 5
Fig. 8.
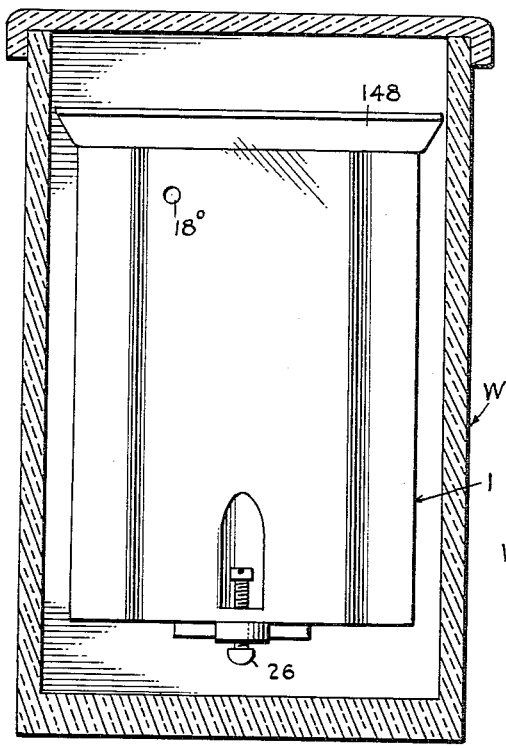
Fig. 9.
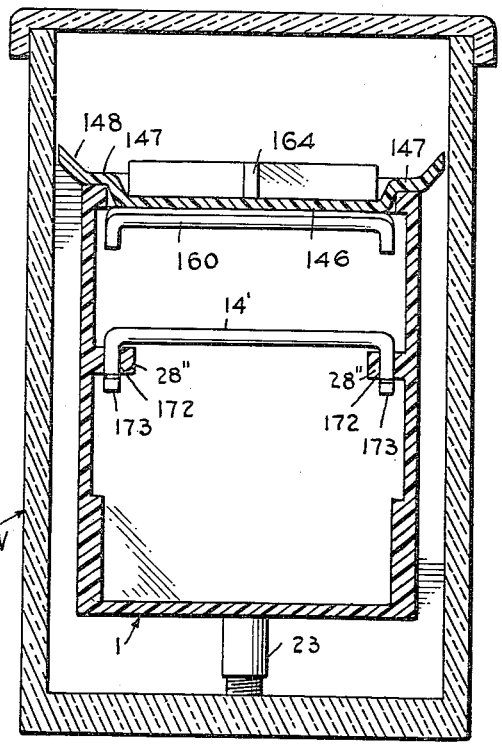
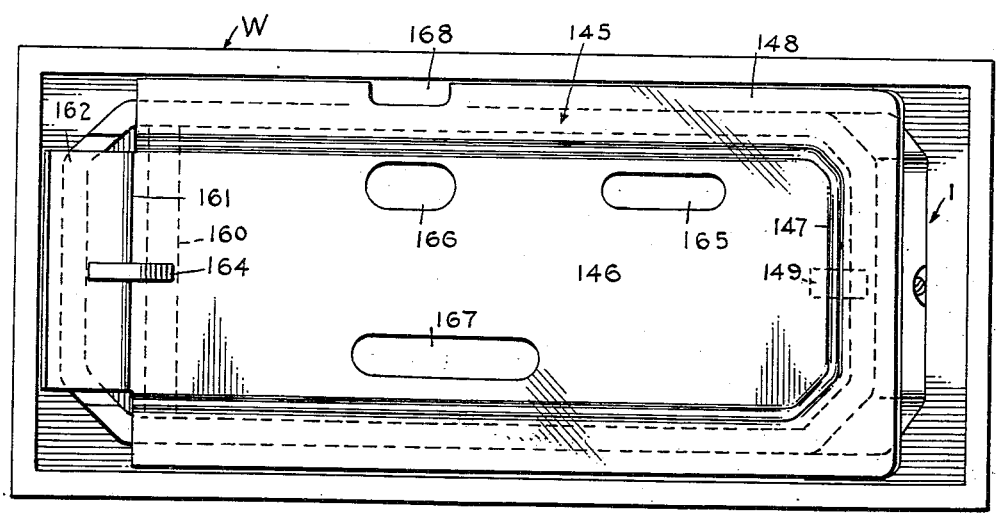
Fig. 10.
INVENTOR.
LEROY B. JAHN
BY
ATTORNEY Sept. 11, 1956      L. B. JAHN      2,762,059
WATER CLOSET FLUSHING MECHANISM Filed May 12, 1952      7 Sheets-Sheet 6

INVENTOR.
LEROY B. JAHN
BY
ATTORNEY

Sept. 11, 1956
L. B. JAHN
2,762,059
WATER CLOSET FLUSHING MECHANISM
Filed May 12, 1952
7 Sheets-Sheet 7
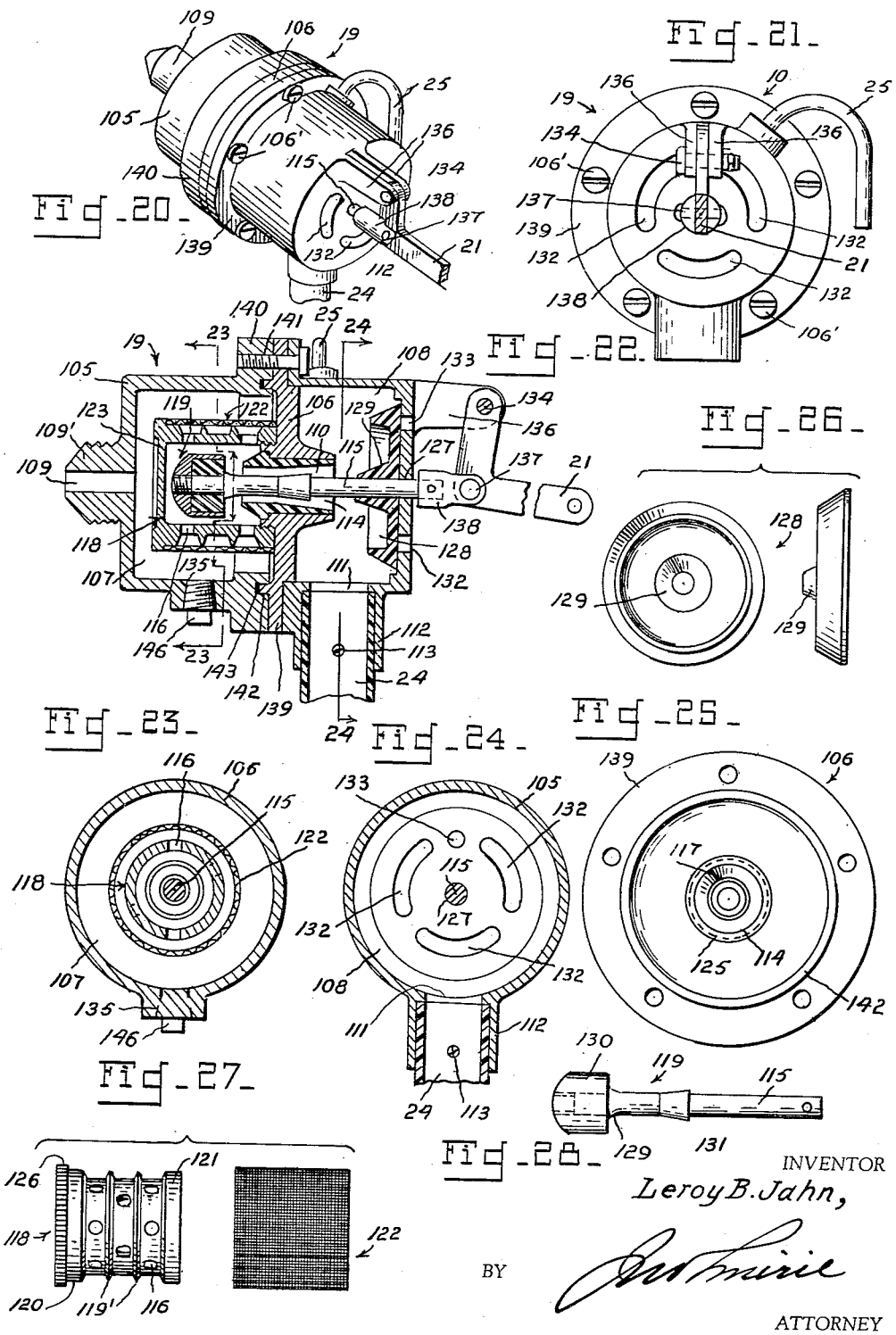
INVENTOR
Leroy B. Jahn,
BY
ATTORNEY United States Patent Office 2,762,059
Patented Sept. 11, 1956

2,762,059
WATER CLOSET FLUSHING MECHANISM
Leroy B. Jahn, Montevideo, Minn.
Application May 12, 1952, Serial No. 287,380
33 Claims. (Cl. 4—32)

This invention relates to water closets and more particularly to improvements in the flushing mechanism therefor, and is a continuation-in-part of my co-pending application Serial No. 766,984, filed August 7, 1947, now abandoned, for Water Closet Flushing Mechanism.

It is, therefore, the primary object of the present invention to provide an improved flushing mechanism of the tilting tank type that has greater simplicity, economy and efficiency.

It is another object of the invention to provide an insulated flushing mechanism that will break the line of electrical conductivity through the water pipes of a construction.

It is another object of the invention to provide a tilting tank type of flushing mechanism that does not require a permanent water trap but is operative through the weight and organization of the parts.

It is another object of the invention to provide a fulcrum support adaptor that is adaptable to prior flush outlet fittings to enable ready installation of the tiltable tank mechanism, without replacement of the fitting.

It is still another object of the invention to provide means for filling the trap of the water closet bowl after a flushing operation.

It is still another object of the invention to provide means for draining water from a water closet so that at no time will there be more than a slight amount of water in the bottom of the water closet, thus eliminating contamination of the water in the bottom of the water closet thereby promoting sanitation.

It is still another object of the invention to bring the water supply pipe through the bottom of the tank so that it will not be surrounded by water in the tank that might be drawn into the pipe line through a threaded connection or through a defective pipe.

It is a further object of the invention to provide a flush valve that is efficient in operation, is simple and economical in design and construction and resists leak-causing deformation.

It is a still further object of the invention to provide a water inlet for a tank that is extremely quiet.

It is yet another object of the invention to provide a flush valve, outlet and fulcrum tank supporting means enabling relative adjustment between the tank, water closet, the tank flush opening and closet outlet and which has simplicity of design, economy of construction and efficiency in operation.

It is yet another object of the invention to provide a removable cover for the tank, which by its coaction with the tank will prevent refuse and foreign matter of any nature from being deposited in the tank through the top thereof.

It is yet another object of the invention to provide a removable cover for the tank which will seal the periphery of the top of the tank except at one end where overflow space is provided. Thus a tank of predetermined size may be provided to limit or stabilize the amount of water to be used in any flushing operation. The cover by its sealing relation with the periphery of the top causes a rapid elevating of the water forward to overbalance the tank to normal position to close the water inlet valve, if for any reason the operation of the tank may be affected by fluctuation of water pressure.

Thus the cover will provide economic water consumption and a positive overbalancing of the tank when filled to its normal condition regardless of water pressure.

The foregoing objects and others ancillary thereto are preferably accomplished, according to a preferred embodiment of the invention, by a tilting tank flushing mechanism wherein all of the control leverage and linkage is located in the underbalanced end of the tank so as to overbalance that end of the tank when the water is flushed therefrom. The tank is formed, preferably, of a nonconductive material, so as to preclude an electric circuit along the water lines and through the tank that, with the normal flush mechanism, would cause an electrolytic action in the water closet that attacks the metal parts of the flushing mechanism. The tank, formed of non-conducting material, has a flush valve seat integral therewith and slightly elevated above the bottom of the tank to trap some water therein. The water closet flush outlet has secured thereto adjustable fulcrum means that are engageable with pin-receiving sockets, adjustably attached to the bottom of the tank in order to enable relative adjustment of the balance of the tank in relation to the fulcrum means which is permanently located below the tank flush opening.

A clamp is adapted to removably fit over the usual flush outlet fitting in a water closet, after the overflow tube has been removed from the lateral neck on the fitting. A fulcrum pin support is adjustably carried by said clamp and, preferably, an adjustable brace is carried by said support. A bore is cut through the bottom of the fitting neck for the admission of water from the bottom of the water closet.

The fulcrum means has secured thereto around the flush opening a flat plate that has therein an opening which conforms in size with the flush opening. Adjustably secured to the bottom of the plate are two relatively adjustable parts, each having an offset opening, and by relative or unitary movement of the plate and its associated parts, the flush opening in the flat plate may be laterally displaced to substantially coincide with the water closet flush outlet.

A flat disc-like flush valve cooperates with the seat in the tank and is provided with a relatively small circular protrusion having an inclined periphery for loosely centering the valve on the seat, a relatively thin flange portion for directly seating on the seat and a stiff rim portion resisting deformation of the relatively thin flange but permitting uniform flexure thereof to form a perfect seal with the seat.

A non-siphoning inlet valve operating mechanism is connected to the flush valve mechanism so that the inlet valve is opened upon opening of the flush valve and is held open by the tilting of the tank until the tank is again filled. This operation of the inlet valve by the flush valve mechanism provides about 20 per cent more water for each flushing operation.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout the several figures and in which:

Fig. 1 is a cross-sectional view taken vertically through a water closet containing a tiltable flush tank and flush mechanism according to the present invention in elevation;

Fig. 2 is a top plan view of the apparatus shown in Fig 1 with the cover removed;

Fig. 3 is a cross-sectional view, similar to Fig. 1, showing the flush valve in open position;

Fig. 8 is an elevational end view of the tank with the water closet in section;

Fig. 9 is a vertical sectional view of the tank and water closet of Fig. 8;

Fig. 10 is a plan view of the cover in place on the tank with the water closet cover and flushing mechanism removed;

Figs. 16 and 17 are enlarged fragmentary cross-sectional views taken vertically through the tank outlet which includes the sleeve depending into the outlet fitting, Fig. 17 illustrating the function of the sleeve in a flushing operation;

Fig. 18 is an elevational view of the split spring locking ring;

Fig. 20 is a perspective view of the inlet flush valve;

Fig. 21 is an end view of the inlet flush valve of Fig. 20;

Fig. 22 is a cross-sectional view of the inlet flush valve of Fig. 20 in elevation;

Fig. 23 is a cross-sectional view on the line 23—23 of Fig. 22;

Fig. 24 is a cross-sectional view on the line 24—24 of Fig. 22 with the automatic check valve removed;

Fig. 25 is an elevational view of the partition of the inlet flush valve;

Fig. 26 is a front and side view of the automatic check valve;

Fig. 27 is an elevational view of the cap and screen; and

Fig. 28 is an elevational view of the valve member.

Figure 4:
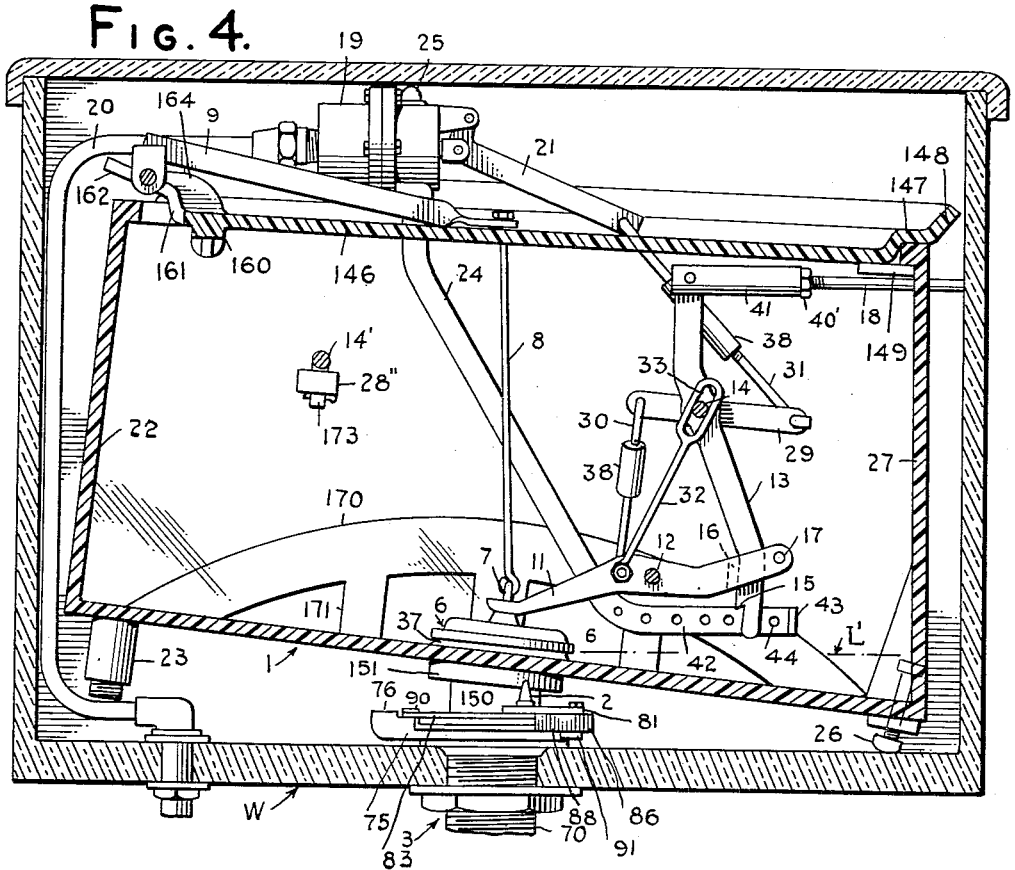
Fig. 4 is a cross-sectional view, similar to Fig. 1, showing the tank in tilted position, the flush valve having just been closed.

Referring now to the drawings, specifically to Fig. 1, the present invention is broadly concerned with flushing mechanism. Briefly, this mechanism comprises a flush tank 1 that is tiltably mounted in a water closet W by means of off-center fulcrum points 2 supported by the centrally located flush outlet fitting 3 and cooperating with off-center sockets 4 mounted on the bottom of the tank 1 for forming a fulcrum for the tank. This fulcrum off-center part is immediately adjacent the centrally located flush outlet of the fitting 3 and the centrally located flush valve assembly 5 in the bottom of the tank so that the flush openings thereof remain in substantially vertical alignment when the tank is in either horizontal or tilted positions.

The flush valve 6 of the valve assembly 5, is connected by a support 7 with the customary type of linkage 8 to the usual bell crank trip lever 9 that terminates outside of the water closet W in the usual manually operable flush handle 10. The valve support 7 is also connected to a lever 11 that is supported by a pivot 12, the opposite end of the valve lever 11 having a slot 16 surrounding a lock lever 13 which is mounted on a pivot 14. The lock lever 13 has a notch 15 which catches over the end of the valve lever 11, when the flush valve 6 is lifted by the handle 10, to lock the lever 11 and hold the valve 6 open to permit full flushing from the tank 1 through the flush opening of the assembly 5, as shown in Fig. 3. The end of the lever 11 may be slotted, or as shown, it may be bifurcated, and the bifurcation 16 closed by a pin 17 so that the end of the lever 11 completely surrounds the lower end of the lock lever 13. A trigger rod 18 is connected to the upper end of the lock lever 13 and extends through the opening 18° in the adjacent end of the tank 1 for abutment with the water closet W, to trip the lock lever 13 and release the valve lever 11 to close the valve 6, upon the tilting of the tank 1 when the tank is flushed, as shown in Fig. 4.

An inlet valve 19 is secured to and supported by the water inlet pipe 20, of the water closet W, and has a control lever 21. A stop member 23 is secured to the overbalanced end 22 of the tank to limit the movement of the tank and carry the weight of the filled tank. The stop member 23 limits the movement of the overbalanced end 22 of the tank to give this end a predetermined elevation over the opposite free end 27 of the tank. An inlet pipe 24 extends downwardly from the outlet of the valve 19, and a small refill tube 25 extends from the valve 19 to a point beyond the outer wall of tank 1.

An adjustable stop member 26 is secured to the free end 27 of the tank 1 for limiting the tilting of the tank and thereby govern the balance of the tank to control the amount of water admitted through the inlet valve 19 for each flushing operation, and the trigger rod 18 may be adjusted in accordance with the adjustment of the stop member 26. The end 27 of the tank 1 is inclined inwardly so that it is substantially parallel with the adjacent end of the water closet when tilted into the position shown in Fig. 4.

The present invention resides in specific improvements to certain elements and in the organization of the elements in a flushing mechanism of the hereinbefore described type, but obviously the mechanism may be varied to a considerable extent with the exception of the elements with which the present invention is specifically concerned. One of the primary improvements according to the present invention resides in an organization which eliminates the necessity of any permanent water trap to trap water to overcome the weight of the overbalanced end of the tank.

It is to be noted that the tank 1 may be properly weighted and balanced without a permanently located water trap, by preferably providing a tank of light weight material so that it is easily subject to overbalancing. Such overbalancing being occasioned by locating all of the weight, such as the control levers and linkage within the underbalanced, light end of the tank, and by proper location of the fulcrum means.

In the first place, referring to Figs. 5 to 10, the tank 1 is preferably composed of a light weight material, and in addition the tank is preferably formed of material that is non-conductive to electricity. Accordingly, the tank is preferably formed of a thermoplastic material, which is both light in weight and electrically non-conductive. The tank may be molded or it may be formed of sheet material and assembled by heat bonding.

In addition to the non-conductive properties of the tank, it is to be pointed out that the use of a tank composed of thermoplastic material will prevent the old and well-known expensive faults and deficiencies caused by the accumulation of condensation on the outside walls of the water closet tank and the subsequent drip occasioned by the accumulation of moisture on the cold walls. It is a well-known fact that the drip from water closets will damage the floors and any coverings on the floor. Wooden floors being subject to rot caused by such dripping and puddles of water on tile floors are detrimental to health and proper sanitation. Therefore, a major object of the invention is to provide a non-sweating flush tank.

When a light weight tank is employed, very little additional weight is needed to overbalance the underbalanced end of the tank. Accordingly, it has been found that the necessary weight may be provided by mounting the various levers and linkage in the short or light end of the tank. Thus, the pivots 12 and 14 and the connection with the inlet valve control lever 21 are all mounted in the underbalanced end of the tank.

It will be noted that when the tank is flushed, the valve lever 11 is locked in open position, as shown in Fig. 3, and therefore the pivot 12 not only supports the lever 11 but also carries the weight of the valve 6, connection link 7, link 8 and bell crank 9 which is held in elevated position by the link 8. The pivot 14 carries the weight of the lock lever 13 and, jointly with the tank end 27, the trigger rod 18. The pivot 12 and tank 1 jointly carry the weight of control connections with the inlet valve 19.

Figure 7:
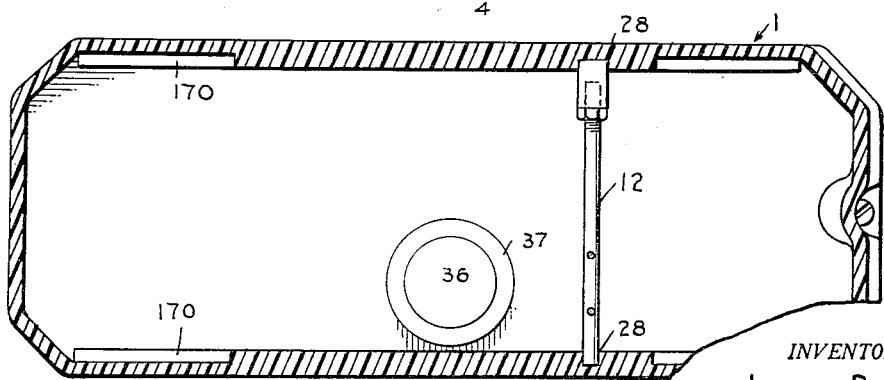
Fig. 7 is a cross-sectional view taken of the tank of Fig. 5.

As the tank 1 is formed of a plastic material it is provided with properly located bearing sockets 28 and apertured bosses 28' on its side walls for supporting the pivots 12 and 14, as best shown in Figs. 2 and 7. The pivot 12 comprises an extensible rod which may be reduced in length to pass the bearing sockets 28 and then extended to seat their ends in the bearing sockets 28. In order to provide a connection with the inlet valve 19, a lever 29 is mounted on the pivot 14, one end of said lever being connected by a link 30 with the flush valve lever 11 and the end of said lever 29 being connected by a link 31 with the inlet valve control lever 21 so that the weight of this connection is located beyond the fulcrum means toward the free end 27 of the tank 1. Thus, the inlet valve 19 is operated by the tilting of the tank 1, and when the tank fills sufficiently to overbalance the tank, the inlet valve 19 is closed.

In addition, a link 32 is connected to the flush valve lever 11 and has a slot 33 surrounding the pivot 14. The slotted end of the link 32 cooperates with the pivot 14 to limit the upward movement of the flush valve and the bell-crank 9, as shown in Fig. 3, for preventing the bell-crank from striking the top of the tank W. The link 30 is adjustable, as by means of a turnbuckle or the like, to provide the proper relationship between the levers 11, 29 and 21 and links 31 and 32, as well as to regulate the stroke of the control lever 21 and the operation of the valve 19.

The formation of the tank from a thermoplastic material enables the integral formation of an elevated flush valve seat with the tank and such a seat is advantageous because the material has a smooth surface that is not subject to pitting or corrosion. As best shown in Figs. 7, 16, 17 and 19, a flush opening 36 is formed in the bottom and centrally of the length of the tank, and the periphery of this opening is beaded on the upper or inner side of the tank bottom to form a smooth, rounded, elevated flush valve seat 37. Due to the elevation of the seat 37, it acts as a dam to trap a small amount of water in the bottom of the tank which will promote the tilting of the tank after the bulk of the water is flushed therefrom.

In operation, the tank 1 normally is filled with water, usually in the neighborhood of the water level L, as shown in Fig. 1, wherein the tank is in a substantially horizontal position, resting on the stop 23. Upon actuation of the flush handle 10, the bell-crank 9 is raised, lifting the link 8 and flush valve 6 which is positively guided in its movement by the lever 11. As the lever 11 is swung about its pivot 12, the lock lever 13 gravitates toward the lock position. If for any reason the lever 13 is retarded in its movement, the cross pin 17 on the end of the lever 11 will cam the lever 13 to lock position wherein the notch 15 of the lever 13 overlies the end of the lever 11 and locks the valve 6 in open position, as shown in Fig. 3.

Upon the lifting of the flush valve lever 11, by the flushing operation, the link 30 is lifted, swinging the lever 29 to pull down on the link 31 which, in turn, pulls down the inlet valve control lever 21 and opens the inlet valve 19 so that water is discharged through the inlet pipe 24 into the tank 1. Thus, as soon as the flushing operation is initiated, the inlet valve is opened to supply additional flushing water. This will provide about 20 per cent more water during each flushing operation, that is, while the flush valve is open and the flushing operation is taking place. Thus a tank of smaller proportions can be installed within the water closet tank and still provide an abundant amount of water for the flushing operation. After the water has left the tank upon completion of the flushing operation, the backward tilting of the tank will take place to close the flush valve to start the refilling operation. During the refilling operation the water supply valve will still remain open to allow the rapid filling of the tank. This action takes place for the reason that the end of the tank carrying the flushing mechanism will tilt backwardly and downwardly sufficiently to close the flush valve and retain the water supply valve open to maintain the same volume of water flow till the tank is filled. When the tank has been filled to predetermined level the end of the tank containing the flushing mechanism will tilt forward and up, thus closing the supply valve against any further water flow.

As soon as the flush valve 6 is opened, the water in the tank 1 flushes through the flush opening 36 and through the outlet in the fitting 3. When the tank is empty, except for the small quantity trapped by the flush valve seat 37 and the slight elevation of the overbalanced end 22, the weight of the various parts, carried by the pivots 12 and 14, causes the tank to tilt. As soon as the tank starts to tilt the small amount of trapped water rushes to the lower end of the tank to impose additional weight and momentum on the tank, the trapped water filling the lower end of the tank to about the water level L', as shown in Fig. 4.

When the tank tilts, the trigger rod 18 is moved, by engagement with the end of the water closet W, and swings the lock lever 13 to release the lever 11 and valve 6 to close the flush valve assembly 5, as shown in Fig. 4. Due to the tilting of the tank 1, the pivot 14 is moved downwardly and lowers the lever 29. The lowering of the lever 29, even though it is swung back to normal position by the closing of the flush valve, pulls down on the link 31 and the control lever 21 to hold open the inlet valve 19 and admit a fresh supply of water into the tank 1. When the tank is properly filled, depending upon the balance of the tank as regulated by the adjustable stop 26, the tank is then tilted back to horizontal position by the weight of the water, whereupon the pivot 14, lever 29 and link 31 are raised, which lifts the valve control lever 21 to close the inlet valve 19.

It is a known fact that in many locations the different minerals and substances contained in water will act as electrolytes and respond to the electric current carried through the flush tank due to the grounding of electric appliances to the water supply pipes. Such reaction takes place when the tank is filling and after the tank has been filled. Therefore another major object of the invention is to provide a non-conductive flush tank.

As previously stated, therefore, the tank 1 is preferably formed of an electrically non-conductive material to prevent an electrolytic action therein. It has been pointed out that it is common practice to ground various electric equipment on the water pipes, and frequently this provides an electric circuit through the pipes that causes an electrolytic action in any stored water, such as in the water closet. This action causes the removal of protective platings or materials in the various metal parts as well as undesirable deposition of metal on other parts.

It is desirable, therefore, to preclude electric circuits through water closets and this may be accomplished, in accordance with the present invention, by use of the non-conducting tank. The inlet tube 24 is also formed of non-conducting material, preferably a thermoplastic, so as to prevent the closing of any possible circuit during operation, and the links 30 and 31 and the trigger rod 18 are all provided with thermoplastic members to prevent corrosion, and the trigger rod 18 is formed from similar material.

The turnbuckles 38 comprise internally threaded sleeves formed of non-conducting material such as thermoplastic. One of the ends of the rods forming the links 30 and 31 are threaded into one of the ends of the turnbuckles 38 and the other ends of the rods are threaded into the opposite ends of the turnbuckles and then connected to the levers 21 and 29, respectively. The trigger rod connection has a bolt carrying pivot member 41 (Fig. 2) for connection with the lock lever 13, and the lock nut 40' is threaded on the trigger rod for fixing adjustment of the rod in the member 38 in accordance with the adjustment of the stop 26.

Another novel feature of the present invention resides in the arrangement and formation of the inlet tube 24, as best shown in Figs. 1, 3 and 4. One of the difficulties with present day flushing mechanism resides in the siphoning of the water from the flush tank back into the water supply system when a vacuum is created in the system. Moreover, the inlet in the tank is usually at the upper part of the tank so that incoming water is poured into the tank and creates a great deal of noise. These defects are avoided, in accordance with the present invention, by extending the lower end of the tube horizontally with relation to the bottom of the tank so that the end portion 42 is substantially parallel with and spaced above the bottom of the tank. The end portion 42 is also substantially parallel with and close to one side wall of the tank 1. The end 43 of the tube is closed and a series of small apertures 44 are spaced longitudinally in both of the sides of the end portion 42. Thus, the water is discharged in a number of small streams into the bottom of the tank. Consequently, there is no large stream of water or sufficient agitation to cause appreciable noise.

To facilitate fabrication of the tank 1 and to afford rigidity, the tank is formed of relatively flexible sheet material.

Figure 19:
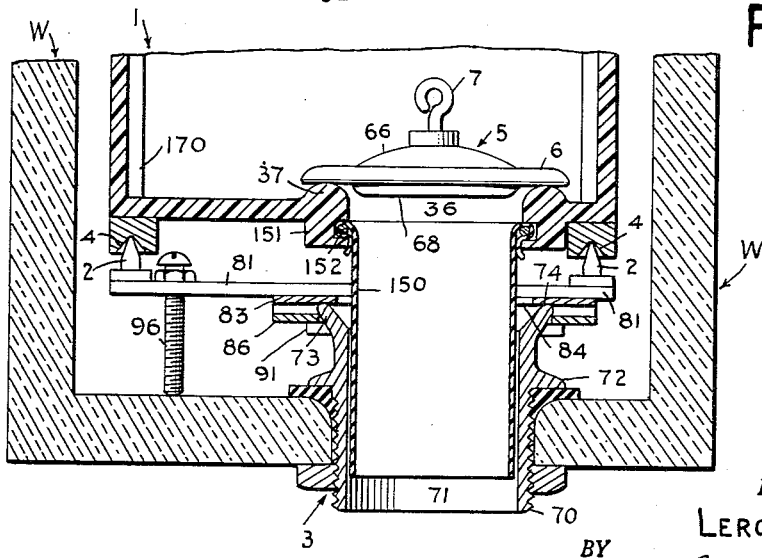
Fig. 19 is an enlarged fragmentary cross-sectional view of the tank of Fig. 1.
Figure 15:
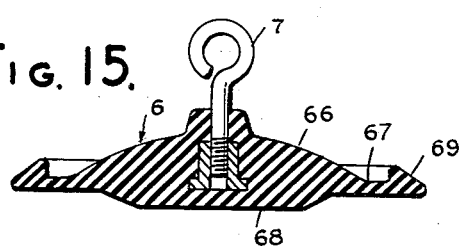
Fig. 15 is a cross-sectional view taken of Fig. 14.

As best shown in Fig. 19, the flush valve seat 37 is relatively flat, in contrast to the usual conical seat such as the regular seat in the outlet fitting 3. The relatively flat seat 37 is less wearing on the valve 6, and in addition the valve 6 comprises a new construction that is permitted by the flat seat 37. The valve 6 is in the form of a relatively flat, solid disc of resilient material such as rubber, and comprises a body portion 66 having a relatively thin and flexible surrounding flange 67 with a frusto-conical portion 68 extending downwardly beyond the bottom plane of the flange 67 and body portion 66, as shown in Fig. 15. The frusto-conical portion 68 is relatively thin and is somewhat smaller in diameter than the interior of the seat 37, while the flange 67 is of somewhat greater diameter than the seat 37. The body portion 66 comprises an upward thickening of the disc to accommodate and surround the connector 7. The bottom surface of the flange 67 is flat, but the upper surface is conical to form a thicker bead 69 spaced concentrically with the body portion 66 and the periphery of the flange 67.

In operation, the valve 6 is operatively self-centering upon being dropped on the seat 37, the frusto-conical portion 68 acting against the inner edge of the seat to shift the valve so that the flange 67 rests on top of the seat. As the seat is substantially flat and the flange is flat, the flange will lie directly on the seat even if it is not perfectly centered, and the water pressure on top of the valve will press the valve down so that there is a perfect seal between the flange 67 and the seat 37. As there may be considerable variation of relative axial positions between the valve 6 and the seat 37, the valve does not become deformed from continuous pressure in one position. The stiffening by the bead 69 prevents collapse but permits flexing of the flange 67.

Figure 11:
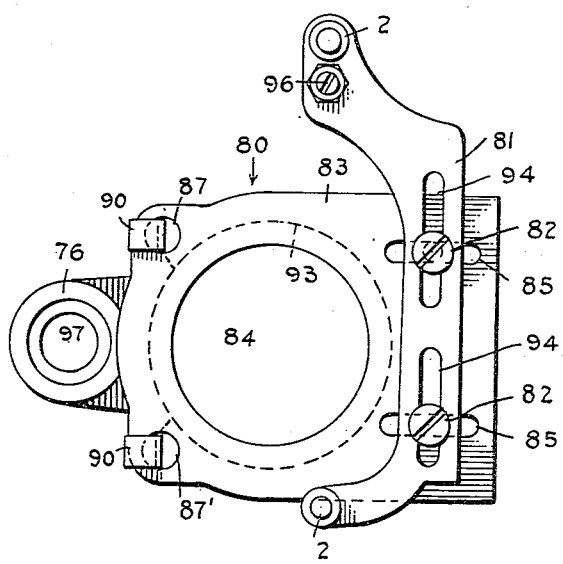
Fig. 11 is an elevational view of the clamp assembly.
Figure 12:
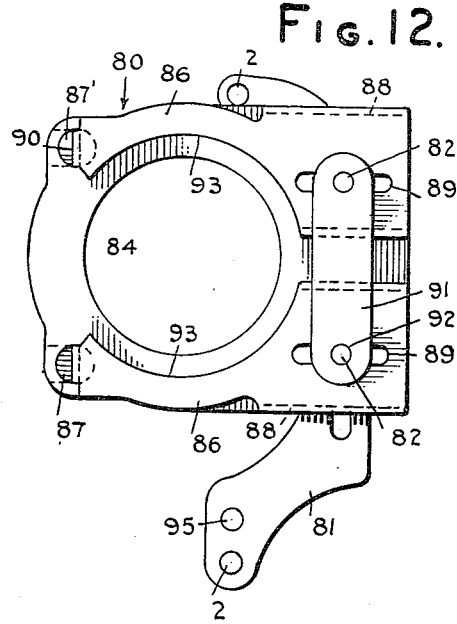
Fig. 12 is a bottom view of the clamp assembly of Fig. 11.
Figure 13:
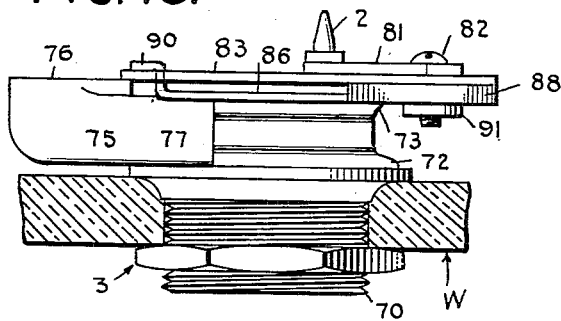
Fig. 13 is an elevational view partly in section of the outlet fitting and showing a side of the clamp assembly of Fig. 11.
Figure 14:
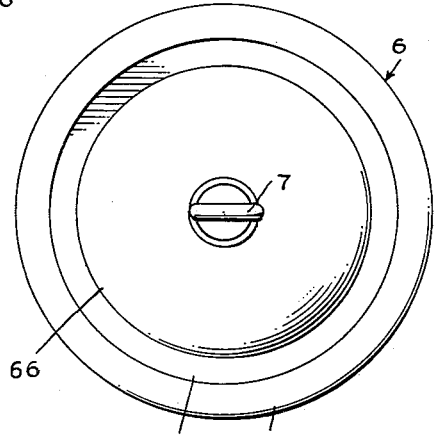
Fig. 14 is an elevational view of the flush valve.

Another feature of the invention relates to an adjustable fulcrum supporting means for cooperation with the ordinary flush outlet fitting 3 and for substantially centering the flush opening of the flush assembly 5 with the outlet of the fitting 3. As best shown in Figs. 11, 12 and 13, the usual outlet fitting 3 comprises a sleeve 70, which defines the flush outlet 71 of the water closet W, and has a collar 72 for overlying the bottom wall of the water closet. The collar 72 terminates at the top in an outwardly flared lip 73 which surrounds the normal valve seat 74. A neck 75 extends laterally from the collar 72 and terminates in a bowl 76 that is open at the top for the reception of the usual overflow tube and communicates with the outlet 71 by a throat 77. For installation of the foregoing flushing mechanism, the usual overflow tube is removed from the bowl 76 to accommodate the tilting tank 1 and permit the mounting of the supporting means on the collar 72 and around the lip 73 in accordance with the present invention.

As best shown in Fig. 11, the adjustable fulcrum supporting means of the present invention comprises a clamping assembly 80 and a fulcrum support element 81 which are adapted to be adjustably connected and secured to the outlet fitting 3 by screws 82, as best shown in Figs. 11 and 12. The clamping assembly 80, as shown in Figs. 11, 12 and 13, comprises a flat plate 83, which may be generally square or rectangular in conformation, having long sides and a foreshortened end and an opening 84 through the plate, closer to one end thereof, and a pair of substantially parallel slots 85 therethrough and extending between said opening 84 and the other end of the plate 83. The plate 83 is provided at each end of the long sides in the foreshortened end with openings 87 and 87', respectively, outwardly of the opening 84 and opposite to the slots 89.

Each of a pair of arms or jaws 86 is respectively pivoted to the plate 83 by means of a reduced L-shaped hook 90 on one end of the arm 86. The hooks 90 coacting with the openings 87 and 87', respectively, provide a perfect hinge in all pivoted positions. The arms 86 having upturned flanges 88 to bear against the plate 83 and space the arms 86 therefrom, and the flanges 88 are at the free ends of the arms and on opposite sides of a slot 89 which extends longitudinally of the arm and is adapted to center under the slot 85 in the corresponding side of the plate 83. The inner sides of the arms 86 are provided with inwardly curved recesses 93 which provide an opening of larger diameter which is concentric with the opening 84. Extending across the bottom of the free ends of the arms 86 is a strap 91 which is provided with threaded openings 92 to receive the screws 82.

The fulcrum support element 81 comprises a crossbar portion which has the two upright fulcrum points 2 positioned respectively at each end and has two longitudinal slots 94 intermediate its length. A threaded aperture 95 is located in one end of the element 81 inwardly of one of the fulcrum points 2 for adjustably receiving an elongated screw 96 for engaging the bottom of the water closet W to brace the element 81.

In mounting the foregoing apparatus, the clamping assembly 80 is mounted on the outlet fitting 3 by spreading the arms 86 to straddle the collar 72 of the fitting 3 and mounting the plate 83 on top of the lip 73 with the hole 84 overlying the flush outlet 71. The arms 86 are then closed to grip the collar 72, and the underside of the lip 73 to retain the fulcrum points 2 in permanent axial alignment and position to assure the proper operation of the tank.

When the arms 86 are closed, their slots 89 underlie slots 85 of the plate 83 and the flanges 88 space the arms 86 from the plate 83 so that the arms are definitely located beneath the lip 73.

The fulcrum support member 81 is mounted on the plate 73 with the slots 94 extending transversely across the slots 85. The bolts 82 are then inserted through the respectively crossed slots 94, 85 and 89 to secure the fulcrum support member 81 to the clamping assembly 80 while clamping the arms 86 against the plate 83 through the flanges 88, as shown in Fig. 13. The fulcrum support member 81 is adjusted to properly position the fulcrum points 2 before the screws 82 are completely tightened, and the brace screw 96 is adjusted so that it bears on the bottom of the water closet W, as shown in Fig. 19, to brace the support member against movement due to variable pressures from the tilting of the tank 1.

When the overflow pipe is removed from the outlet fitting 3, a small hole 97 is drilled through the bottom of the bowl 76 in line with the throat 77. The bottom of the bowl 76 is very slightly above the floor of the water closet W so that the hole 97 is open to any water in the bottom of the water closet W which will flow through the throat 77 and fill the closet bowl trap and eliminate sweating on the closet W.

As the outlet fitting 3 may not be centrally located between front and rear of the water closet W, the support member 81 is adjusted, through its slots 94, to position the fulcrum points 2 longitudinally and transversely between the side walls and end walls of the closet in order to accommodate the tank 1. The flush outlet 36 is centrally of the longitudinal axis of the tank 1, and consequently may be offset relative to the outlet fitting 3, but this may be compensated for by the adjustment of the clamping assembly.

It has been found that the water will back up through the outlet fitting 3 and into the water closet W if there are restrictions in the passage to the bowl. This is due to the fact that the head of water in the tank 1 is not directly connected with the bowl but may flow into the water closet W and thereby lose its force in the absence of a sealed passage during the flushing operation. To preclude this loss of force, as shown in Figs. 16 and 17, an expandable sleeve 150 is secured to the bottom of the tank 1 beneath the flush opening 36 to extend down into the outlet fitting 3. This sleeve 150 is formed of a thin flexible, and preferably elastic material that will tightly fit in the outlet bore 71 under pressure (Fig. 17), forming a seal with the walls of the bore 71 to prevent the water from flowing out through the throat 77 or over the top of the fitting 3 into the water closet W. The sleeve must be flexible to permit the refill passage of water between it and the bore 71, from the water closet W or throat 77, when the bore and sleeve is not filled with backed up water. Thus there can be no accumulation of water in the bottom of the water closet. In addition, the sleeve must freely accommodate the movement relative to the outlet fitting 3 when the tank 1 is tilted, although at this time the water will be substantially all flushed and not backed up.

In the present existing equipment there is always at least two inches of water that could accumulate in the water closet at the time the water flush ball or valve is sucked down to a seat. This remaining water becomes contaminated through long operation of the flush tank creating an unsanitary condition in the flush tank. Therefore another major object of the invention is the provision of the tube 150 within the outlet flush opening 36 to prevent accumulation of water in the water closet W.

The sleeve 150 is subject to wear due to the passage and pressure of the water and rubbing against the fitting 3 and is, therefore, preferably mounted so that it may be readily replaced without dismantling the tank 1. To accomplish this, an inturned annular flange 151 is provided on the bottom of the tank 1 substantially concentric with the flush opening 36. The sleeve 150 is extended into the flush opening 36 and then a split spring locking ring 152 is then inserted into the sleeve 150 to force the sleeve into the groove in the flange 151 on the bottom of the tank 1. The sleeve 150 is then pulled outwardly of the tank 1 through the flush opening 36 to assume the position previously described. In this position the sleeve 150 covers the split spring locking ring 152 to eliminate contact of the water with the ring and thus prevent corrosion of the ring when in use.

Figure 5:
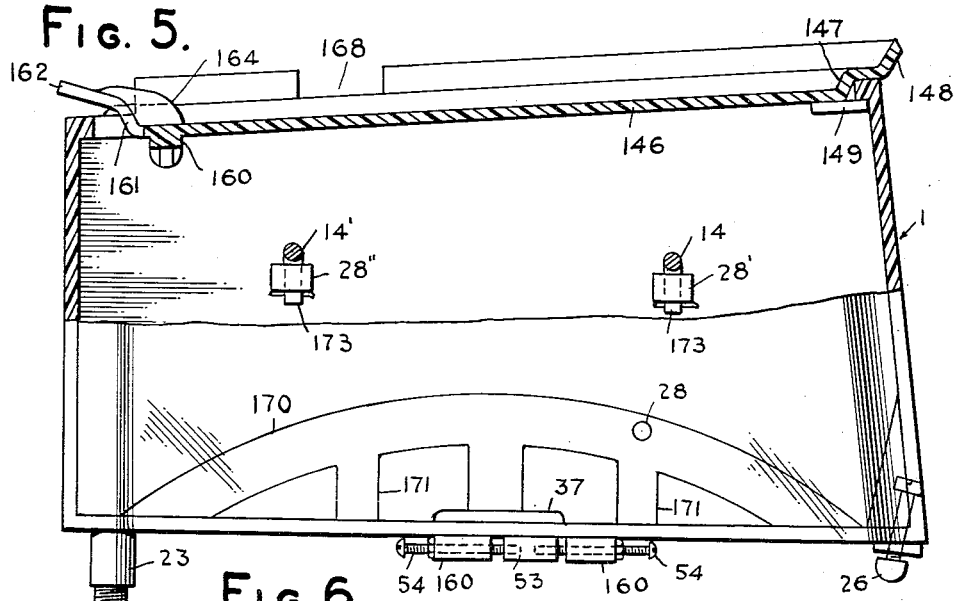
Fig. 5 is an elevational view of the tank and cover partly broken away and partly in section.
Figure 6:
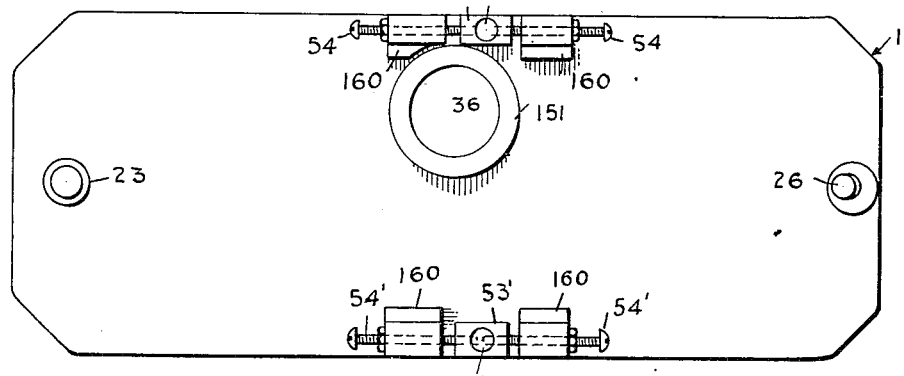
Fig. 6 is a bottom plan view of the tank of Fig. 5.

The tank is formed completely of thermoplastic material as shown in Figs. 5 and 6, wherein the apertured bearing blocks 160 for the adjustable fulcrum means are formed integrally with the bottom of the tank and the tank is internally reinforced. The fulcrum point receiving sockets 53—53' are mounted between the spaced bearing blocks 160 at each side of the tank 1 and the adjustment screws 54—54' are inserted through the apertures in the bearing blocks 160 for cooperation with the sockets 53—53'.

The tank 1 is preferably reinforced by internal arches 170 integral therewith and extending along the inside of the side walls from one bottom corner to the other, and spaced upright ribs 171 connect the bottom of the tank and the arches 170. The pivot 14 is provided with perpendicular hooked ends 173 which enter the vertical bores 172 in the bearing sockets 28'. The tank 1 is also provided with similarly formed bearing sockets 28'' which are in alignment with and relatively spaced from the bearing sockets 28'. A pivot 14' similar to the pivot 14 is mounted for coaction with the bearing sockets 28'' in the same manner as is the pivot 14 mounted in relation to the bearing sockets 28'. As the sockets 28' and 28'' are integral with the side walls of the tank 1, the pivots 14 and 14' tie the walls together in opposition to any warping by the weight of the water in the tank and may be readily mounted and dismounted by vertically sliding the hooked ends 173 from the bores 172.

Still another major feature of the invention resides in the water supply or inlet valve 19, which is specifically shown in Figs. 20 to 28. This valve comprises a sectional casing 105 that is divided by a transverse partition 106 to define an inlet chamber 107 and an outlet chamber 108. The chambers 107 and 108 preferably are cylindrical as shown in Fig. 22, the interior circumfeernce of the outlet chamber 108 being somewhat larger than the interior circumference of the inlet chamber 107.

An inlet opening 109, is in communication with the water supply pipe 20 by means of the standard fitting 109' which is provided in the casing 105 substantially axially thereof. As shown in Figs. 1, 3 and 4 it will be seen that the water supply or inlet valve 19, in order to comply with recently passed laws, is located above the full water level in the tank 1. A water passage 110 through the partition 106 connects the two chambers 107 and 108 substantially axially of the inlet chamber and the outlet chamber. An outlet opening 111 from the outlet chamber 108 is surrounded by a boss 112 integral with the casing 105 and adapted to receive the tube 24 forming the inlet for the tank. As the tube 24 preferably is formed of a thermoplastic material, it may have a snug fit in the boss 112 and be retained in any suitable manner as by a cotter pin 113.

A suitable valve seat 114 is mounted in the passage 110 and a cylindrical cage or valve chamber 118 is mounted on the inlet side of the partition 106 and surrounding the valve seat 114. A valve member 119 is slidable in the cage or chamber for cooperation with the valve seat 114. The valve stem 115 being passed through and slidable in the valve seat 114 to extend through and outwardly of the passage 110 in the partition 106. The cage or chamber 118 is provided with a plurality of rows of apertures 116 which are positioned in the cage or chamber so that the intermediate rows of apertures is in staggered relation to the outer rows. The rows are separated by annular bevelled flanges 119'. At the ends of the cage or chamber, flat flanges 120 and 121 are provided to support with the aid of the annular flanges 119', the cylindrical screen 122. The cage or chamber 118 has a closed end 123. Therefore when the cage or chamber is in position on the partition 106 and the internal threads 124 of the chamber 118 are engaged with the threads 125 on the partition 106 and the cage tightened, the annular flange 126 outwardly of the flange 120 will engage and force the screen 122 into contact with the partition 106. Thus no sand or other foreign matter can pass from the inlet chamber into the cage or valve chamber. It is to be noted that the screen 122 is bridged outwardly from the apertures 116 at its ends by the flat flanges 120 and 121, at each end. The intermediate portion of the screen 122 is bridged outwardly by means of the bevelled flanges 119'. Thus the capacity of the apertures 116 will not be diminished by the screen being forced inwardly by water pressure. The stem 115 extends through the valve passage 110 and the outlet chamber 108, and is slidably mounted in an aperture 127 in the casing 105. An automatically operating check valve 128 is slidably mounted on the valve stem 115 within the chamber 108. The valve stem is provided with an inclined flange 129 to hold the rubber valve 130 within the valve member 119 and also to guide the valve member 119 in central relation to the valve seat 114. In inverted relation to and spaced from the flange 129 is a similarly formed flange 131, the purpose of which is to spread the flow of water on the opening of the valve, to eliminate force of water along the valve stem and also to spread and deflect any foreign material that may tend to be an obstruction to the free sliding action of the automatic check valve on the valve stem 115.

Surrounding the aperture 127 in the casing 105 and communicating with the outlet chamber 108 is a plurality of segment shaped anti-siphoning apertures 132. The casing 105 is provided with a port 133 which communicates with the refill tube 25 and when the valve member 119 is unseated the check valve 128 will, under pressure, slide forward on the valve stem 115 to seal off all escape of water through the apertures 132 to force all water admitted to the outlet chamber 108 to leave the outlet chamber 108 through the tube 24 and also through the refill tube 25. With the check valve 128 in this position, water will be prevented from leaving the valve chamber 108 through the apertures 132.

When the outlet chamber 108 is receiving water on the opening of the valve, considerable pressure is built up within the chamber which holds the automatic check valve 128 tightly against the casing to prevent water from leaving the apertures 132. When the valve 119 is closed and water ceases to come from the supply chamber 107, the water settling out of the outlet chamber 108 creates a momentary vacuum within the chamber and the normal atmospheric pressure on the outside moves the automatic check valve 128 away from its seat by the inrush of air through the apertures 132, thus leaving a free air passage through apertures 132 around the check valve, back through the water chamber and into the supply pipe should vacuum be created therein from any cause. Spaced apertured ears 136 extend from the top of the casing 105 and straddle and pivotally support the end of the bell lever 21. The lever 21 extends forwardly of the casing 105 by means of the pivot 134 and is pivotally connected at its elbow by a pivot 137 to the cross head 138 which is secured to the end of the valve stem 115. Thus the raising and lowering of the outer end of the lever 21 moves the valve member 119 to and from its seat in the inlet chamber. The chamber 108 is provided with an annular apertured flange 139 and the chamber 107 is provided with an annular flange 140 having threaded bores 141. The flanges 139 and 140 coact with the partition 106 and when bolts 106' are passed through apertures in the flange 139 and partition 106 and threadably engaged with threaded bores 141 on flange 140, the chambers will be united in water tight relation to each other due to the annular tongue 142 on the inlet chamber of the casing being seated in the annular groove 143. The groove 143 has a gasket 144 seated in the bottom thereof, thus making a water tight fit between the inlet chamber 107 and the partition 106. The inlet chamber is provided on the bottom with a threaded drain port 135 to permit foreign matter to be washed out of the inlet chamber surrounding the cage or chamber 118. A threaded drain plug 146 is used to close the drain port 135.

When the lever 21 is pulled down, by the operation of the flush valve and the tilting of the tank 1 when it is flushed, it swings the crosshead 138 toward the casing 105, to push the valve stem 115 inwardly to move the valve 119 away from the seat 117. Water is then admitted from the inlet chamber 107, through the cage 118 and valve passage 110 into the outlet chamber 108 and then out the outlet 111 and through the tube 24. When the lever 21 is raised, upon tilting of the filled tank 1 back to horizontal position, it draws the crosshead 138 forwardly to pull the valve stem 115 to move the valve 119 to closed position on the seat 117. It will be noted that inlet water pressure is against the valve 119 and will also close the valve 119 when the lever 21 is released. The tilting action of the tank will create a snap action on the water supply valve, thus providing a rapid silent discontinuance of the water flow. Therefore another of the major objects of this invention is to eliminate the excessive noise inherent to present water flush mechanisms which has become a sound hazard.

Whereas the inlet chamber 107 is normally filled with water, the outlet chamber is normally empty since the outlet 111 is adjacent the bottom of said chamber. The refill tube 25, therefore, is connected to the top portion of said outlet chamber 108.

The cover 145 shown in Fig. 10 is provided with a main portion 146 that fits inside of the top of the tank 1. Along both sides and one end of the portion 146 extends a fitted L-shaped flange 147 which engages and seals the top rim of the tank 1. Integral and extending outwardly from the edge of the flange 147 is the inclined flange 148. The flange 148 is adapted to be slightly spaced from the inner surface of the water closet. Thus when the cover 145 is in place on the rim of the tank 1, it will prevent paper, rags or any foreign matter of a contaminated nature from getting into the tank or around the outside of it to prevent its proper functioning.

Integral with the bottom surface of portion 146 at one end thereof is a notched lug 149 that fits under the inner rim at the top of the tank and prevents the cover from being lifted up by water pressure accumulating within the tank during the filling process. Integral with the bottom surface of the portion 146 at the opposite end is a U-shaped guide 160 which permits that end of the cover to be lifted slightly by water pressure occasioned in the tank during the filling process in the tank and at the time of its tilting to a filled position. Thus any waste water will be allowed to escape over the rim of the tank and through the flush opening in the bottom of the water closet. After the waste water has left the tank the U-shaped guide 160 will insure the cover being properly seated on the rim of the tank. At the end not provided with the flanges 147 and 148 is a flange 161 similar to flange 147 and a flange 162 similar to flange 148, the ends of the flanges 147 and 148 being spaced from the ends of the flanges 161 and 162 to permit the water supply pipe 20 to pass upwardly to the position shown in Fig. 1 and to permit free operation of the usual bell crank trip lever 9. The flanges 161 and 162 are provided with a brace member 164 to prevent breakage of the flanges.

The portion 146 is provided with elongated slots 165, 166 and 167.

Elongated slot 165 is provided for the movement of the upper end of the link 31 which is connected with lever 121 of the supply valve during the opening and closing of the valve with the tilting of the tank.

Elongated slot 166 is provided for the supply valve refill tube 25 to extend downward into the tank and allow the free tilting of the tank with no obstruction from the cover.

Elongated slot 167 is provided for the operation of the rod 8 connected to the flush valve 6 which is operated by trip lever 9.

The end of the cover carrying the flanges 161 and 162 is slightly spaced from the adjacent end of the tank to allow spilling of any excessive water or pressure created within the tank during the time of filling or tilting.

The flange 148 is provided with a notch or opening 168 which is in alignment with the elongated slot 166 in the portion 146 of the cover 145. The opening 168 is adapted to receive the end of the refill tube 25, which extends downwardly between the tank 1 and the water closet W. The discharge end of the refill tube 25 is spaced a sufficient distance from the interior of the water closet W, so that water leaving the refill tube 25 will pass downwardly to the bottom of the water closet W without contacting the wall of the water closet W thus preventing the chilling of the water closet W and prohibiting condensation from forming on the outer surface of the water closet W.

Although a certain specific embodiment of the invention has been shown and described, it is obvious that many modifications thereof are possible. The invention, therefore, is not to be restricted except insofar as is necessitated by the prior art and by the spirit of the appended claims.

What I claim is:

1. A water closet flushing mechanism comprising a casing tank, a flush tank freely tiltably mounted in said casing tank and spaced from the walls thereof, an outlet in said casing tank to the bowl of a water closet, an outlet in said flush tank to overlie said casing tank outlet and for discharging water from said flush tank to the bowl, inlet and outlet means for supplying and discharging water to and from said flush tank, means for causing tilting of said flush tank in accordance with the quantity and location of water therein, and fulcrum supporting means between said casing tank and said flush tank for tiltably supporting said flush tank, said fulcrum means including two pointed pins on one of said tanks and two cooperating conical sockets on the other of said tanks, said pins and sockets being predeterminedly positioned for alignment and to predeterminedly position said flush tank within said casing tank, said sockets having a greater circumference than said pins to freely receive said pins and to guide the points of said pins to the apexes of said sockets.

2. A water closet flushing mechanism as in claim 1 wherein the flush tank is formed of a non-conductive material to prevent the passage of an electric current through the mechanism.

3. In a flushing mechanism of the type wherein a flush tank is adapted to be tiltably mounted off-center within a casing supporting an inlet valve and having a flush outlet and a manually operable flush actuation mechanism, a flush valve for closing a flush opening through the tank into the casing and cooperative with means for opening said valve upon the operation of said flush actuation mechanism, means for overbalancing the tank upon flushing the water therefrom and control means including a control lever for operative connection with the inlet valve to be operated by the tilting of the tank for filling the tank, the improvement in said control means for a connection between said control lever and the outlet value to be subject to the weight of the water pressure on the outlet valve in closing said inlet valve to maintain a tightly closed inlet valve when the tank is full.

4. In a flushing mechanism of the type wherein a flush tank is adapted to be tiltably mounted off-center within a casing supporting an inlet valve and having a flush outlet and a manually operable flush actuation mechanism, a flush valve for closing a flush opening through the tank into the casing and cooperative with means for opening said valve upon the operation of said flush actuation mechanism, means for overbalancing the tank upon flushing the water therefrom and control means for operative connection with the inlet valve to be operated by the tilting of the tank for filling the tank, the improvement which comprises a substantially centrally located flush opening in the bottom of said tank to substantially overlie the casing flush outlet to permit flushing from said tank through said opening directly into said outlet, an elevated valve seat around said flush opening and fulcrum means on said flush tank for cooperating with fulcrum means in the casing adjacent the flush outlet to tiltably support said tank.

5. In a flushing mechanism of the type wherein a flush tank is adapted to be tiltably mounted off-center within a casing supporting an inlet valve and having a flush outlet and a manually operable flush actuation mechanism, a flush valve for closing a flush opening through the tank into the casing and cooperative with means for opening said valve upon the operation of said flush actuation mechanism, means for overbalancing the tank upon flushing the water therefrom, and control means for operative connection with the inlet valve to be operated by the tilting of the tank for filling the tank, the combination with said closet and tank of a centrally located flush outlet and flush opening, respectively, with said flush opening superimposed over said flush outlet to discharge directly thereinto, and fulcrum means immediately adjacent said flush opening and outlet to tiltably support said tank while maintaining said flush opening substantially directly above said flush outlet during the tilting of the tank.

6. In a flushing mechanism of the type wherein a flush tank is adapted to be tiltably mounted off-center within a casing supporting an inlet valve and having a flush outlet and a manually operable flush actuation mechanism, a flush valve for closing a flush opening through the tank into the casing and cooperative with means for opening said valve upon the operation of the flush actuation mechanism, an elevated valve seat concentric with the flush opening creating a water trap for overbalancing the tank upon flushing the water therefrom and control means for operative connection with the inlet valve to be operated by the tilting of the tank for filling the tank, the combination with said tank of an inlet tube connected to said inlet valve and extending into juxtaposition with said water trap to discharge the water into said trap to provide noiseless filling of said tank.

7. In a flushing mechanism as in claim 6 wherein an internal flange is provided on the bottom of the tank concentric with the elevated valve seat and flush opening and a flexible means is secured to said flange to seal the flush outlet to prevent water from backing up into the casing.

8. In a flushing mechanism of the type wherein a flush tank is adapted to be tiltably mounted off-center within a casing supporting an inlet valve and having a flush outlet and a manually operable flush lever mechanism, a flush valve for closing a flush opening through the tank into the casing, means for overbalancing the tank upon flushing the water therefrom, and control means for operative connection with the inlet valve to be operated by the tilting of the tank for filling the tank, the combination with said flush valve of means for connecting said flush valve with said flush lever mechanism to be operated thereby for directly opening said tank flush opening.

9. In a flushing mechanism of the type wherein a flush tank is adapted to be tiltably mounted within a casing supporting an inlet valve and having a flush outlet and a manually operable flush actuation mechanism, a flush valve for closing a flush opening through the tank into the casing and cooperative with means for opening said valve upon the operation of said flush actuation mechanism, means for overbalancing the tank upon flushing the water therefrom and control means for operative connection with the inlet valve to be operated by the tilting of the tank for filling the tank, the combination with said tank of an inwardly inclined end wall to be substantially parallel with the adjacent end of the casing when said tank is tilted upon the flushing operation, to permit the full extension of said tank within said casing.

10. In a flushing mechanism of the type wherein a flush tank is adapted to be tiltably mounted off-center within a casing supporting an inlet valve and having a flush outlet and a manually operable flush actuation mechanism, a flush valve for closing a flush opening through the tank into the casing and cooperative with means for opening said valve upon the operation of said flush actuation mechanism, means for overbalancing the tank upon flushing the water therefrom and control means for operative connection with the inlet valve to be operated by the tilting of the tank for filling the tank, the combination with said tank of support means fixed on said tank for abutment with the casing to limit the tilting of the tank, said support means being adjustable to vary the center of gravity to control the admission of water to said tank.

11. Flush mechanism for a casing having a water inlet, a flush outlet and a manually operable flush operating means, said flush mechanism comprising support means to be mounted in the casing adjacent said flush outlet, a flush tank movably fitting in the casing, a flush opening substantially centrally in the bottom of said tank to substantially overlie the casing flush outlet to permit flushing from said tank through said opening directly into said outlet, a valve seat around said flush opening, a flush valve cooperative with said valve seat and operatively connectable with the casing flush valve operating means, means on said tank for cooperating with said support means to tiltably support said tank off-center, means in the underbalanced end of said tank to overbalance and tilt said tank upon the flushing of water therefrom, the underbalanced end of said tank being inclined inwardly to be substantially parallel with the adjacent end of the casing when said tank is tilted, an inlet valve connectable to the casing water inlet and having a discharge pipe extending into the bottom of said tank, a control lever for said inlet valve and connected with said tank to open said inlet valve when said tank is overbalanced and tilted and to be subject to the overbalancing of the full tank to close said inlet valve, a lever pivotally mounted in said tank and connected at one end to said flush valve to guide said valve in a selected path, a lock lever pivotally mounted in said tank and having lock means for cooperation with the free end of said valve lever to lock said lever in valve open position to flush said tank, a trigger rod operatively connected to said lock lever and extending through the inclined end of said tank for abutment with the adjacent end wall of the casing upon the overbalanced tilting of the tank for actuating said lock lever to release said valve lever and permit closing of said valve, and an adjustable support on the bottom of the overbalanced end of said tank to limit the tilting of the tank and vary the center of gravity to control the quantity of water admitted to said tank through said inlet valve.

12. In a flushing mechanism of the type wherein a tank is adapted to be tiltably mounted in a casing to be overbalanced and tilted upon the flushing of water therefrom, an outlet flush valve in said tank and operatively connected with manual means for opening said flush valve, a lock in said tank operable upon the opening of said flush valve and engageable with said flush valve for holding said valve open until the water is discharged and the tank is overbalanced and tilted, and a member connected to said lock and slidably carried by said tank for releasing said lock upon contact of the outer end of said member with the casing when the tank is tilted.

13. A mechanism as defined in claim 12 wherein a control element for a supply valve is connected to said tank to actuate the supply valve when the tank is tilted, an adjustable stop mounted on the end of said tank for abutment with said casing to limit the tilting of said tank and vary the center of gravity of said tank to regulate the amount of water admitted to said tank for each flushing action, said lock releasing member being adjustable to compensate for the limit of movement by the tank imposed by said member.

14. In combination, a water closet having a flush opening in the bottom thereof, a flush outlet fitting in said opening and having a collar terminating in a lip at the top and with an overflow neck extending laterally therefrom, a clamp removably mounted on said fitting and surrounding said collar and clamping said lip, a support element adjustably supported by said clamp, a flush tank having a flush opening in the bottom thereof and an annular inturned flange on the bottom of the tank concentric with the flush opening, a flush valve seat surrounding said tank opening and formed integrally with said tank, off-center fulcrum means on said flush tank for mounting on and cooperating with said support element to tiltably support said tank, a flush valve for cooperation with said seat, a flush handle on said water closet and operatively connected by a link to said valve, a lever journalled in said tank and connected to said valve to guide the movement thereof, a lock lever journalled in said tank for cooperation with said valve lever to lock said valve in open position, a trigger rod connected to said lock lever and extending through the end of said tank for abutment with said water closet when the tank tilts to release said valve lever, a flexible sleeve secured to the inturned flange on the bottom of the tank and extending down into said outlet fitting, an inlet valve mounted in said water closet and having a control lever, a lever journalled in said tank, a link connecting said control lever with said latter lever, a link between said latter lever and said flush valve lever, said levers, trigger rod and links being mounted in the underbalanced end of said tank to overbalance said tank and when the tank is substantially empty of water, an inlet tube extending downwardly from said inlet valve adjacent one side to a point below the water line of said tank.

15. In combination, a water closet having a flush opening in the bottom thereof, a flush outlet fitting in said opening and having a collar terminating in a lip at the top, a clamp removably mounted on said fitting and surrounding said collar and clamping said lip, a support element adjustably supported by said clamp, fulcrum means at each end of said support element, a flush tank to be tiltably mounted in said water closet and having a flush opening in the bottom thereof, fulcrum means on said flush tank for mounting and cooperating with said support element fulcrum means, an elevated valve seat in said tank concentric with said flush opening, an inturned flange on the bottom of said tank concentric with said flush opening and a flexible sleeve secured to the inturned flange and extending downwardly into said flush outlet fitting.

16. In a flushing mechanism for a water closet having a flush opening in the bottom thereof and a flush outlet fitting in said opening and having a collar terminating in a lip at the top, a clamp to be removably mounted on the flush outlet fitting to surround the collar and clamp the lip thereof, a support element adjustably supported by said clamp, fulcrum means at each end of said support element, a flush tank to be tiltably mounted in the water closet and having a flush opening in the bottom thereof, fulcrum means on said flush tank for mounting on and cooperating with said support element fulcrum means, and means for adjusting said fulcrum means so that said flush tank can be adjusted in longitudinal relation to said support fulcrum means.

17. In a flushing mechanism for a water closet having a flush opening in the bottom thereof and a flush outlet fitting in said opening and having a collar terminating in a lip at the top, a clamp to be removably mounted on the fitting to surround the collar and clamp the lip thereof, a support element adjustably supported by said clamp, fulcrum means at each end of said support element, a flush tank to be tiltably mounted in said water closet and having a flush opening in the bottom thereof, fulcrum means on the bottom of said tank for mounting on and cooperating with said support element fulcrum means, and means for adjusting said fulcrum means for movement relative to said flush opening to permit positioning of said flush opening over the flush outlet fitting.

18. In combination, a water closet having a flush opening in the bottom thereof, a flush outlet fitting in said opening and having a collar terminating in a lip at the top and having an overflow neck extending laterally therefrom, a clamp removably mounted on said fitting and surrounding said collar and clamping said lip, a support element adjustably supported by said clamp, fulcrum means at each end of said support element and adjustable brace means on said support element to adjust the plane of the support element in relative relation to the plane of the flush opening.

19. In combination, a water closet having a flush opening in the bottom thereof, a flush outlet fitting in said opening, fulcrum means mounted on said flush outlet fitting, a flush tank to be tiltably mounted in said water closet and having a flush opening in the bottom thereof, fulcrum means on said flush tank for mounting on and cooperating with said outlet fitting fulcrum means, an inturned flange on the bottom of said flush tank concentric with the flush opening therein, means for adjusting the fulcrum means on the flush tank for adjusting the inturned flange for coincidence with said flush opening in the water closet to permit positioning of said inturned flange over said outlet fitting and a flexible sleeve carried by said inturned flange and extending downwardly into said outlet fitting.

20. A water closet drain for a water closet having an independent internal flush tank, comprising a flush outlet fitting in the water closet, and a flexible sleeve depending from the outlet of the internal flush tank into said fitting, said sleeve being expansible by the flush water to seal with said fitting.

21. A water closet drain and trap filler for a water closet having an independent internal flush tank, comprising a flush outlet fitting in the water closet and having an overflow neck, a hole through the bottom of said overflow neck, and a flexible sleeve depending from the outlet of the internal flush tank into said fitting, said sleeve being expansible by the flush water to seal with said fitting.

22. A fulcrum support adaptor for mounting on a flush outlet fitting which is installed in a water closet, said adaptor comprising a clamp member to be removably clamped to the fitting, slot means in said clamp member, a support member having slot means therein, fulcrum means carried by said support member, said support member being mounted on said clamp member with the two slot means crossing and extending transversely of each other, and bolt means extending through the crossed slot means to adjustably secure said support member to said clamp member.

23. A fulcrum support adaptor for mounting on a flush outlet fitting which is installed in a water closet, said adaptor comprising a clamp member including a plate to lie on top of the fitting, a hole in said plate to overlie the flush opening in the fitting, a pair of parallel slots in said plate intermediate of said opening and one end of said plate, a pair of arms pivotally mounted to opposite sides of said plate and adjacent the side overlying the overflow neck extending from the fitting, a slot in each arm to respectively underlie the slots in said plate, a fulcrum support member mounted on said plate and extending transversely of said plate slots, slot means extending longitudinally of said support member and transversely overlying said plate slots, fulcrum means mounted at each end of said support member, and bolts extending through said support member slot means, said plate slots and said arm slots to adjustably clamp said support member to said clamp member and to clamp said arms and plate on opposite sides of the fitting lip.

24. A fulcrum support adaptor for mounting on a flush outlet fitting which is installed in a water closet, said adaptor comprising a clamp member including a plate to lie on top of the fitting, a hole in said plate to overlie the flush opening in the fitting, a pair of arms pivotally mounted to opposite sides of said plate and adjacent the side overlying the overflow neck extending from the fitting, spacer flanges turned up from said arms for abutment with said plate to space said arms below the lip of the fitting, two parallel slots on opposite sides of said plate, a slot in each arm to respectively underlie said plate slots, a fulcrum support member mounted on said plate and extending transversely of said plate slots, slot means extending longitudinally of said support member and transversely overlying said plate slots, fulcrum points mounted at each end of said support member, and bolts extending through said support member slot means, said plate slots and said arm slots to adjustably clamp said support member to said clamp member and to clamp said arms and plate on opposite sides of the fitting lip and to the spacing imposed by said lugs.

25. A fulcrum support adaptor for mounting on a flush outlet fitting which is installed in a water closet, said adaptor comprising a clamp member including a plate to lie on top of the fitting, a hole in said plate to overlie the flush opening in the fitting, a pair of arms pivotally mounted to opposite sides of said plate and adjacent the side overlying the overflow neck extending from the fitting, spacer flanges turned up from said arms for abutment with said plate to space said arms below the lip of the fitting, two parallel slots on opposite sides of said plate, a slot in each arm to respectively underlie said plate slots, a fulcrum support member mounted on said plate and extending transversely of said plate slots, slot means extending longitudinally of said support member and transversely overlying said plate slots, fulcrum points mounted at each end of said support member, a brace member adjustably mounted at one end of said support member for abutment with the water closet, and bolts extending through said support member slot means, said plate slots and said arm slots to adjustably clamp said support member to said clamp member and to clamp said arms and plate on opposite sides of the fitting lip and to the spacing imposed by said flanges.

26. A flushing mechanism for a water closet having a flushing handle and an inlet valve comprising fulcrum means, a tank tiltably supported off center by said fulcrum means, a flush opening in the bottom of said tank, a flush valve cooperative with said opening, connecting means attached to said valve for connection with the water closet flushing handle, a lever journalled in said tank and connected at one end to said valve, a lock lever journalled in said tank and operative to engage said valve lever to hold said valve in open position when said valve is actuated by the flushing handle, a trigger element operatively connected with said lock lever and extending beyond said tank for engagement with the water closet when the tank tilts to release said lock lever from said valve lever, a control mechanism for the inlet valve and connected to and carried by said tank to operate said inlet valve when said flush valve is opened and when said tank is tilted, said levers and trigger element and control mechanism being mounted in the underbalanced end of said tank, and cover means cooperating with the top of said tank to confine the water in said tank to overbalance said tank should the tank fail to tilt due to fluctuation of water pressure.

27. A flushing mechanism for a water closet having a flushing handle and an inlet valve, comprising fulcrum means, a tank tiltably supported off center by said fulcrum means, a flush opening in the bottom of said tank, a valve seat surrounding said opening and extending above the bottom of the tank to trap some water in the tank, a flush valve cooperative with said valve seat, connecting means attached to said valve for connection with the water closet flushing handle, a lever journalled in said tank and connected at one end to said valve, a lock lever journalled in said tank and operative to engage said valve lever to hold said valve in open position when said valve is actuated by the flushing handle, a trigger element operatively connected with said lock lever and extending beyond said tank for engagement with the water closet when the tank tilts to release said lock lever from said valve lever, and a control mechanism for the inlet valve and connected to and carried by said tank to operate said inlet valve when said tank is tilted, said levers and trigger element and control mechanism being mounted in the underbalanced end of said tank to overblance said tank when it is flushed and initiate tilting of said tank to cause the trapped water to flow to said end to add weight and momentum thereto.

28. A flushing mechanism for a water closet having a flushing handle and an inlet valve, comprising fulcrum means, a tank tiltably supported off center by said fulcrum means, a flush opening in the bottom of said tank, a flush valve cooperative with said opening, connecting means attached to said valve for connection with the water closet flushing handle, a lever journalled in said tank and connected at one end to said valve, a lock lever journalled in said tank operative to engage said valve lever to hold said valve in open position when said valve is actuated by the flushing handle, a trigger element operatively connected with said lock lever and extending beyond said tank for engagement with the water closet when the tank tilts to release said lock lever from said valve lever, and a control mechanism for the inlet valve and connected to and carried by said tank to operate said inlet valve when said tank is tilted, means for overbalancing when it is flushed, said tank and means cooperating with the top of said tank for preventing the disposal of foreign matter in said tank.

29. An independent internal flush tank for a water closet, comprising an open topped tank formed of thermoplastic, a removable cover for closing said tank, an outlet in the bottom of said tank, and fulcrum means mounted directly on the bottom of said tank laterally of said outlet.

30. A flushing mechanism for a water closet having a flushing handle and an inlet valve comprising fulcrum means, a tank tiltably supported off center by said fulcrum means, a flush opening in the bottom of said tank, a flush valve cooperative with said opening, connecting means attached to said valve for connection with the water closet flushing handle, a lever journalled in said tank and connected at one end to said valve, a lock lever journalled in said tank and operative to engage said valve lever to hold said valve in open position when said valve is actuated by the flushing handle, a trigger element operatively connected with said lock lever and extending beyond said tank for engagement with the water closet when the tank tilts to release said lock lever from said valve lever, and a control mechanism for the inlet valve and connected to said flush valve and carried by said tank to operate said inlet valve when said flush valve is opened and when said tank is tilted, said levers and trigger element and control mechanism being mounted in the underbalanced end of said tank to overbalance said tank when it is flushed.

31. A flushing mechanism for a water closet having a flushing handle and an inlet valve comprising fulcrum means, a tank tiltably supported off center by said fulcrum means, a flush opening in the bottom of said tank, a flush valve cooperative with said opening, connecting means attached to said valve for connection with the water closet flushing handle, a lever journalled in said tank and connected at one end to said valve, a lock lever journalled in said tank and operative to engage said valve lever to hold said valve in open position when said valve is actuated by the flushing handle, a trigger element operatively connected with said lock lever and extending beyond said tank for engagement with the water closet when the tank tilts to release said lock lever from said valve lever, an intermediate lever pivotally mounted in said tank, a link between said intermediate lever and said flush valve lever, and a link between said intermediate lever and the inlet valve to operate said inlet valve when said flush valve is opened and when said tank is tilted, said levers and trigger element being mounted in the underbalanced end of said tank to overbalance said tank when it is flushed.

32. In a flushing mechanism of the type wherein a flush tank is adapted to be tiltably mounted within a casing supporting an inlet valve and having a flush outlet and a manually operable flush actuation mechanism, a flush valve for closing a flush opening through the tank into the casing and cooperative with means for opening said valve upon the operation of said flush actuation mechanism, means for overbalancing the tank upon flushing the water therefrom and control means for operative connection with the inlet valve to be operated by the tilting of the tank for filling the tank, the combination with said tank of an inwardly inclined end wall to be substantially parallel with the adjacent end of the casing when said tank is tilted upon the flushing operation, to permit the full extension of said tank within said casing, a top rim on said tank which is inclined from said inclined end wall to the opposite end wall, the angle of inclination of said top rim being such that it inclines downwardly from said inclined end wall when said tank is in normal filled position but inclines downwardly to said inclined end wall when said tank is tilted to filling position, and a cover on said top rim and closing said tank, whereby when the tank is filling and the water reaches the top of the tank the cover forces the water rapidly toward the opposite end of the tank to quickly overbalance the tank.

33. In a flushing mechanism as defined in claim 32, said covered tank having an opening at the end of said tank opposite said inclined end wall to permit overflow of excess trap filling water into the casing when the tank is tilted to normal position.

References Cited in the file of this patent

UNITED STATES PATENTS

| | | |
|---|---|---|
| 402,246 | Holt et al. | Apr. 30, 1889 |
| 848,147 | Willms | Mar. 26, 1907 |
| 1,475,841 | McNeil | Nov. 27, 1923 |
| 1,659,839 | Smith | Feb. 21, 1928 |
| 1,690,251 | Schlesinger et al. | Nov. 6, 1928 |
| 1,814,616 | Boesger | July 14, 1931 |
| 2,190,160 | Mason et al. | Feb. 13, 1940 |
| 2,270,910 | Svirsky | Jan. 27, 1942 |
| 2,306,508 | Svirsky | Dec. 29, 1942 |
| 2,306,621 | Giansetto | Dec. 29, 1942 |
| 2,395,606 | Zinkil et al. | Feb. 26, 1946 |
| 2,465,866 | Gaines | Mar. 27, 1949 |
| 2,520,346 | Swenson | Aug. 29, 1950 |
| 2,562,330 | Peterson | July 31, 1951 |
| 2,602,933 | Curry | July 15, 1952 |
| 2,604,113 | Barsano | July 22, 1952 |
| 2,614,263 | Kass | Oct. 21, 1952 |
| 2,615,174 | Barling et al. | Oct. 28, 1952 |
| 2,620,097 | Titmas | Dec. 2, 1952 |

FOREIGN PATENTS

| | | |
|---|---|---|
| 21,722 | Great Britain | Nov. 28, 1892 |